(No Model.)
W. H. DANIELL.
CULINARY VESSEL.
No. 256,648. Patented Apr. 18, 1882.
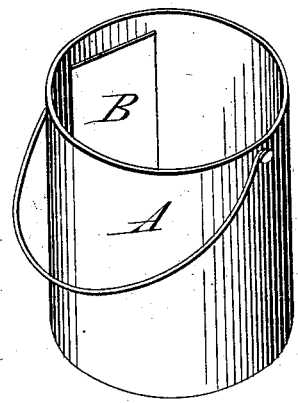
Fig. 1.
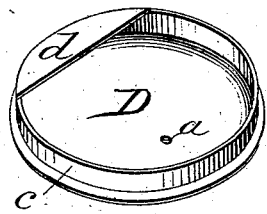
Fig. 2.
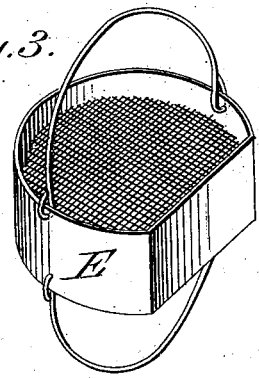
Fig. 3.
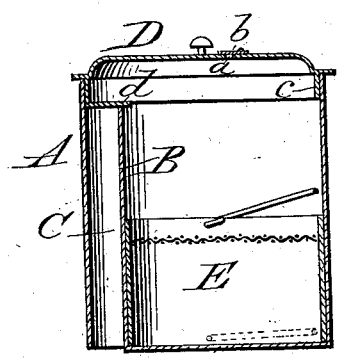
Fig. 4.
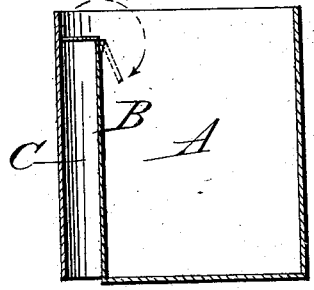
Fig. 5.
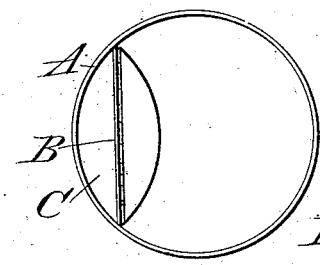
Attest:
F. H. Schott.
A. R. Brown.
Inventor.
William H. Daniell
C. H. Watson & Co. atty

UNITED STATES PATENT OFFICE.

WILLIAM H. DANIELL, OF POTTSVILLE, PENNSYLVANIA.

CULINARY VESSEL.

SPECIFICATION forming part of Letters Patent No. 256,648, dated April 18, 1882.

Application filed August 18, 1881. (No model.)

*To all whom it may concern:*

Be it known that I, WILLIAM H. DANIELL, a citizen of the United States of America, residing at Pottsville, in the county of Schuylkill and State of Pennsylvania, have invented certain new and useful Improvements in Culinary Vessels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in culinary vessels, the object being to provide a simple and efficient utensil for boiling and steaming; and it consists in the construction and arrangement of parts, as hereinafter more fully described and claimed.

In the accompanying drawings, Figure 1 is a perspective view of the vessel with cover and steaming and boiling pan removed; Fig. 2, a perspective view of the cover inverted; Fig. 3, a similar view of the steaming and boiling pan; Fig. 4, a vertical section through the vessel, the steaming and boiling pan and cover being in place; and Fig. 5, a vertical section and plan of the vessel, showing a modification.

A represents a cylindrical vessel, of tin or other suitable material, having a bail or handle.

B is a vertical plate or partition, arranged a short distance from the periphery of the cylinder, extending across the vessel A and up to within a short distance of its top, forming a flue or opening, C, open at the top and bottom for the passage of heat upward into the vessel A, or for the escape of odors or steam from the same down into the fire.

D represents a cover, slightly convex; or it may be a raised corrugated one, having a flange, $c$, of sufficient depth to nearly touch the top of the partition B when the cover is in place on the vessel A, in which it fits snugly, as seen in Fig. 4. This cover has on its top a knob or handle, and also a small hole or aperture, $a$, closed by a pivoted door, $b$, permitting one to see into the vessel, introduce water or seasoning, or to allow of the escape of odors or steam. Across the bottom of the flange $c$ is fastened a thin plate or cover, $d$, corresponding in shape to the contour of the flue C, as shown in Fig. 2. This plate or cover can rest on the top of flue C when the cover D is inserted, as shown in Fig. 4, thus closing said flue. By turning the cover slightly the plate will also be turned, partially uncovering the flue, or by further turning the flue may be entirely uncovered.

E is the steaming and boiling pan, formed of a thin metal frame adapted to fit loosely within the vessel A. It has a perforated or wire bottom or diaphragm, and is provided at top and bottom with bails, as shown in Fig. 3. The wire or perforated bottom is secured within the pan, so as to leave a shallow rim on one side of it and a deep one on the other.

When used for boiling the vessel A is nearly filled with water, the articles to be boiled being placed in the pan E, which is next slipped into the vessel A by means of the bail until it rests on the bottom of the same. The cover D is now put on, so as to bring the plate $d$ over and entirely cover the flue C. The articles being boiled, resting on the wire or perforated diaphragm, between which and the bottom of the vessel A there is a small space caused by the shallow rim of the pan, are thereby prevented from burning in case of excessive heating of the bottom of the vessel A. When the boiling is considerably advanced the cover D is turned to partially or wholly open the flue C, permitting the escape of steam and odors through the same into the fire. By means of the bail the pan, with its contents, is readily removed after boiling.

For steaming, the pan E is placed in the vessel A with its wide rim downward, thus leaving a large space between its bottom and the bottom of the vessel A, as shown in Fig. 4, which space is partly filled with water. The articles to be steamed are placed on the wire or perforated bottom, and the cover D is put on, covering the flue. The steam formed within the vessel A is thus confined and passes upward through the meshes or perforations of the diaphragm and envelops the articles to be steamed. When the operation is complete the cover is so turned as to open the flue C, allowing the confined steam to escape through said flue into the fire, after which the cover is taken off and the pan removed by the bail.

Instead of the plate *d* on the cover D, a plate or valve corresponding in shape to the opening of the flue C may be hinged to the top of the partition B and used for opening and closing the flue, as shown in Fig. 5.

It is evident that the vessel A may be used without the pan E for boiling, if desired.

There may be either one or more flues C arranged around and within the periphery of the cylinder A, the cover D having the corresponding plates or covers for them, in which case the pan E will conform in shape so as to easily fit in the vessel A.

Having thus described my invention, what I claim as new, and desire to secure by Letters Patent, is—

1. The combination, with the vessel A, having a partition, B, forming a flue, C, open at each end, of the lid D, provided with a plate, *d*, adapted to cover the upper end of said flue, substantially as specified.

2. The combination of the vessel A, having a partition, B, forming a flue, C, adapted to be opened and closed, the lid D, having an opening, *a*, provided with cover *b*, and the reversible pan E, having a perforated bottom or diaphragm, and provided with two bails, substantially as shown and described.

In testimony whereof I affix my signature in presence of two witnesses.

WILLIAM H. DANIELL.

Witnesses:
ALFRED D. NIMOCKS,
G. E. CHADSEY.